Figure 1:
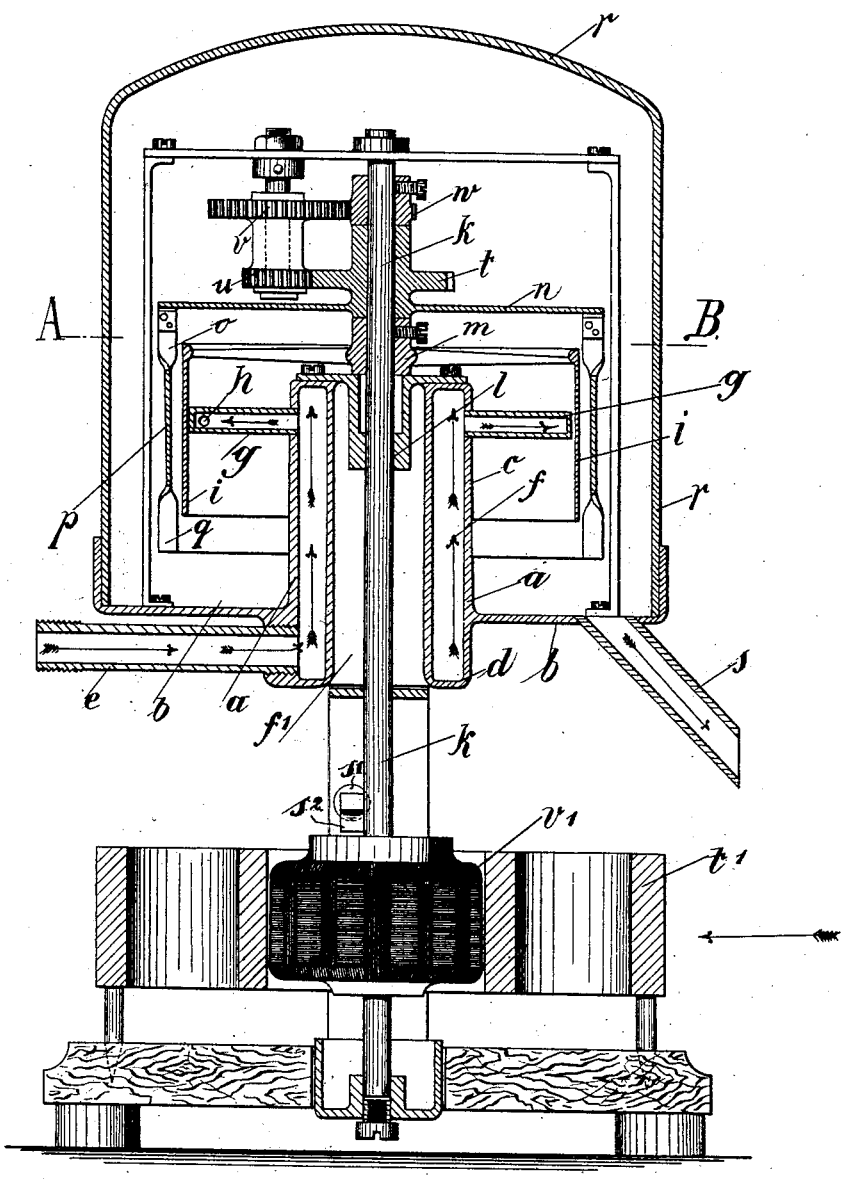

No. 763,695. PATENTED JUNE 28, 1904.
E. ROTH.
WATER TURBINE.
APPLICATION FILED SEPT. 19, 1902.
NO MODEL. 2 SHEETS—SHEET 1.

Attest
A. M. Kelly
Wm. Rodney

Inventor
Eugen Roth
By his atty

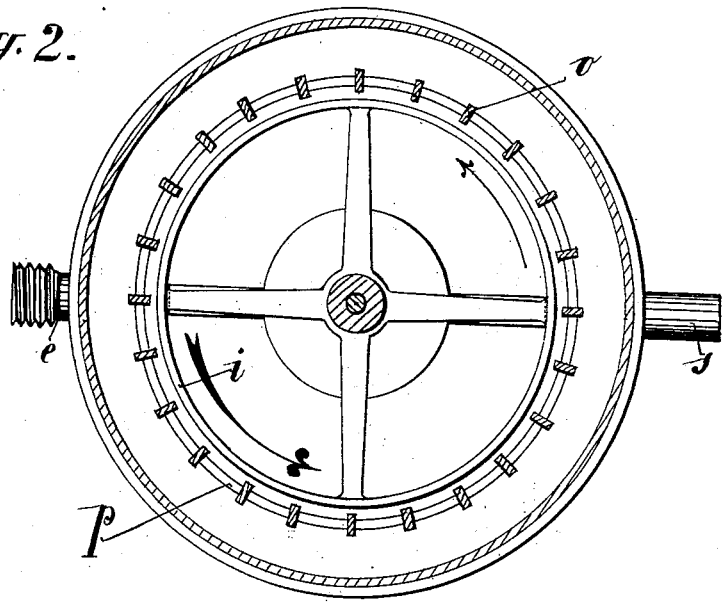
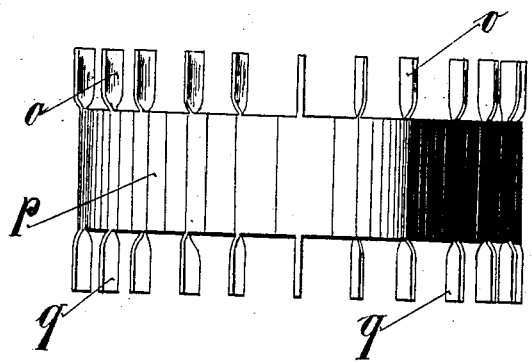

No. 763,695. Patented June 28, 1904.

UNITED STATES PATENT OFFICE.

EUGEN ROTH, OF BERLIN, GERMANY.

WATER-TURBINE.

SPECIFICATION forming part of Letters Patent No. 763,695, dated June 28, 1904.

Application filed September 19, 1902. Serial No. 123,997. (No model.)

*To all whom it may concern:*

Be it known that I, EUGEN ROTH, a subject of the German Emperor, residing at Berlin, (Schöneberg,) Germany, (whose post-office address is Feurigstrasse 12, Schöneberg, Berlin, Germany,) have invented certain new and useful Improvements in Water-Turbines, of which the following is a specification.

This invention relates to a water-turbine which is designed so as to allow of the most favorable utilization of power, particularly in the case of small installations, and for the generation of electricity. The turbine is easily connected to an ordinary water-pipe tap and then runs at once at full capacity.

The essential characteristics of the turbine are that the turbine-head, which is formed as a basin for the collection of the water, is provided with an annular continuation forming a double chamber which projects from the basin above and below, one of these chambers being designed for the reception of the water and for feeding the water by small radial pipes to a driving-drum, the other internal chamber being adapted for the reception of the turbine-axle, on which is arranged the driving-drum, which is inverted over the small pipes. In order to allow of the most favorable utilization of power, a second outer drum provided with vanes is placed in an inverted position over the smooth inner drum, such outer drum utilizing the power which is contained in the water delivered from the inner drum, so that the water which escapes from the turbine has given up practically all its power.

The turbine is constructed so that it can be removed from a lower part and placed on another lower part. In one case the turbine is designed to drive directly a magneto-electric machine and in the other case it serves to drive mechanical devices.

In order that this invention may be the better understood, I now proceed to describe the same with reference to the accompanying drawings and to the letters marked thereon.

Figure 1 shows a vertical section through the turbine with the lower part formed as a dynamo-electric machine. Fig. 2 shows a section on the line A B of Fig. 1, and Fig. 3 is an elevation of the drum with vanes.

The turbine-head $a$, Fig. 1, is formed like a basin $b$ and has an annular continuation $c\ d$, which forms a double chamber. The part $c$ of this continuation is extended in an upward direction from the basin, and the other part, $d$, is directed downward.

The water which enters the turbine through a pipe $e$ in the direction of the arrow passes through a chamber $f$, formed by the prolongation, and thence outward through radial pipes $g$ in order to be delivered by the small orifices $h$. The latter are arranged so that the water escaping therefrom rotates a smooth drum $i$. The water can flow off freely upwardly and downwardly from the drum $i$, which is quickly rotated by the water. The latter is thus advantageously utilized at first, and it is further utilized as described hereinafter. A turbine-axle $k$ is carried through an inner chamber $f'$, formed by the prolongations $c\ d$, the other chamber, $f$, receiving the water. The axle $k$ and the drum $i$, attached thereto by a collar $m$, can thus be introduced from above, whereby the construction is greatly simplified and the turbine can be easily taken apart or put together. A collar or boss $l$ is provided on the continuation $c$ as a bearing for the axle $k$. The water which runs off the drum $i$ is further utilized by its action on an outer drum $p$, provided with vanes $o\ q$. This drum is carried by arms $n$, extending from the boss of a cog-wheel $t$, situated loose on the axle $k$. The water flowing over the upper edge of the drum $i$ impinges on the vanes $o$, and the water escaping from the lower part of the drum $i$ impinges on the vanes $q$. In order that the force exerted on the drum $p$ may be transmitted to the axle $k$, the cog-wheel $t$ engages with a cog-wheel $u$, fixed to a cog-wheel $v$ and rotating with the latter loosely on a fixed axle. The cog-wheel $v$ engages with a cog-wheel $w$, fixed to the axle $k$. The rate of velocity increases from the drum $p$ in the proportion of about from one to four, so that the drum $p$ has the tendency to drive the axle $k$ with very great velocity. In consequence the whole power which the drum $p$ can give off is utilized by being transmitted to the axle $k$. The water when leaving the drum has been utilized to such an extent that it drops off the drum without any force and passes outward through the pipe $s$.

The axle or shaft $k$ may be connected with any device to which power is to be transmitted. In the form of construction shown in Fig. 1 the rotation of the axle $k$ is transmitted to an armature $v'$ in the magnetic field of magnet $t'$, and the electric current is taken off by suitable brushes connected with the binding-posts $s'$.

By removing the turbine from one driven part and connecting it with another the same turbine may be used direct for mechanical driving and for the generation of electricity. This arrangement is especially advantageous for galvanoplastic work, where two complete machines are otherwise required, one for polishing and one for electrodeposition.

What I claim, and desire to secure by Letters Patent of the United States, is—

1. In a water-turbine the combination of a water-head having an annular water-chamber provided near the top with radial spray-pipes and having a pan surrounding the annular water-chamber and arranged below the spray-pipes, a shaft extending through the annular water-chamber, and a drum carried by the shaft above the water-chamber and having its walls inclosing the spray-pipes.

2. In a water-turbine the combination of a water-head having an annular water-chamber provided near the top with radial spray-pipes and having a pan surrounding the annular water-chamber and arranged below the spray-pipes, a shaft extending through the annular water-chamber, and a drum carried by the shaft above the water-chamber and having its walls inclosing the spray-pipes, a second drum surrounding the outer drum, and power-transmitting connections between the second drum and the shaft.

3. In a water-turbine the combination of a water-head having an annular water-chamber provided near the top with radial spray-pipes and having a pan surrounding the annular water-chamber and arranged below the spray-pipes, a shaft extending through the annular chamber, a drum carried by the shaft above the water-chamber and having its walls inclosing the spray-pipes, a second drum surrounding the outer drum and provided on its lower edge with propelling-vanes and power-transmitting connections between the second drum and shaft.

4. In a water-turbine the combination of a water-head having an annular water-chamber provided near the top with radial spray-pipes and having a pan surrounding the annular water-chamber and arranged below the spray-pipes, a shaft extending through the annular water-chamber, a drum carried by the shaft above the water-chamber and having its walls inclosing the spray-pipes, a second drum surrounding the outer drum, and provided on its upper edge with propelling-vanes and power-transmitting connections between the second drum and shaft.

5. In a water-turbine the combination of a water-head having an annular water-chamber provided near the top with radial spray-pipes and having a pan surrounding the annular water-chamber and arranged below the spray-pipes, a shaft extending through the annular water-chamber, a drum carried by the shaft above the water-chamber and having its walls inclosing the spray-pipes, a second drum surrounding the outer drum and provided on both upper and lower edges with propelling-vanes and power-transmitting connections between the second drum and shaft.

6. In a water-turbine the combination of a water-head having an annular water-chamber provided near the top with radial spray-pipes and having a pan surrounding the annular water-chamber and arranged below the spray-pipes, a shaft extending through the annular water-chamber, a drum carried by the shaft above the water-chamber and having its walls inclosing the spray-pipes, a second drum, and speed-multiplying power-transmitting connections between the second drum and shaft.

In testimony whereof I have hereunto set my hand in the presence of two witnesses.

EUGEN ROTH.

Witnesses:
  WOLDEMAR HAUPT,
  HENRY HASPER.